H. TRUST.
FOOD HANDLING APPARATUS.
APPLICATION FILED JUNE 10, 1913.
1,114,070.
Patented Oct. 20, 1914.
5 SHEETS—SHEET 3.
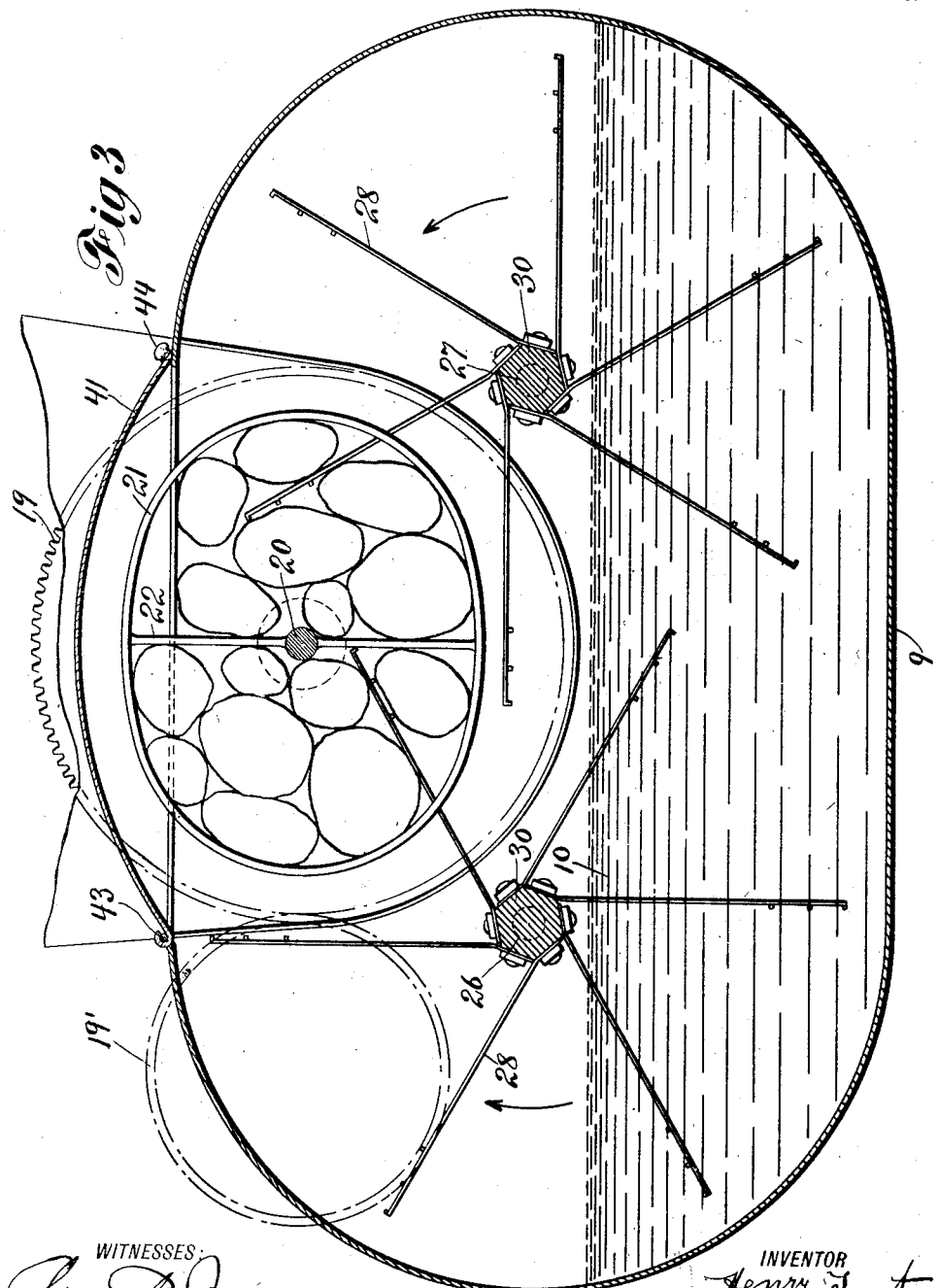
WITNESSES:
INVENTOR
Henry Trust
BY
ATTORNEY

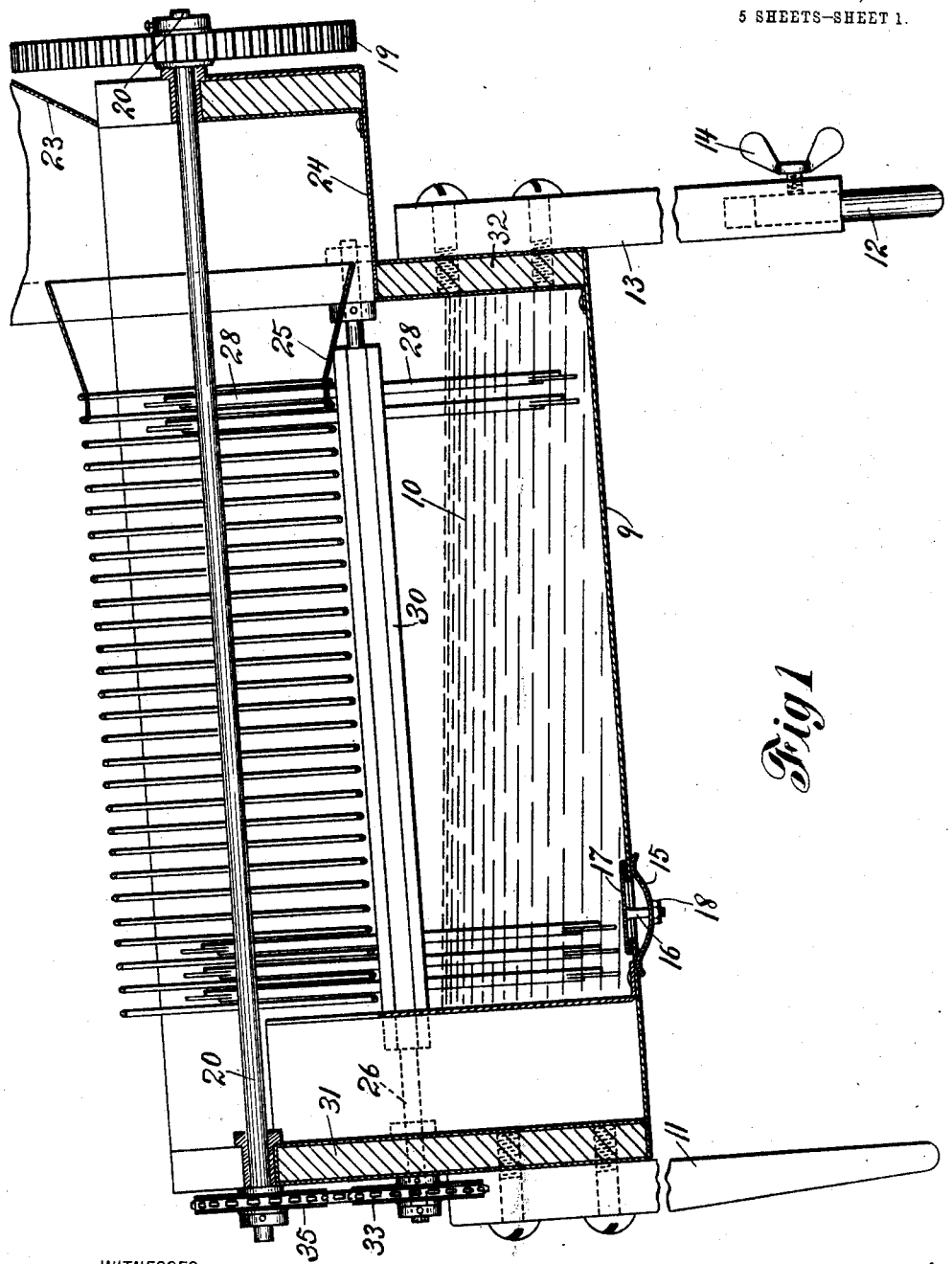

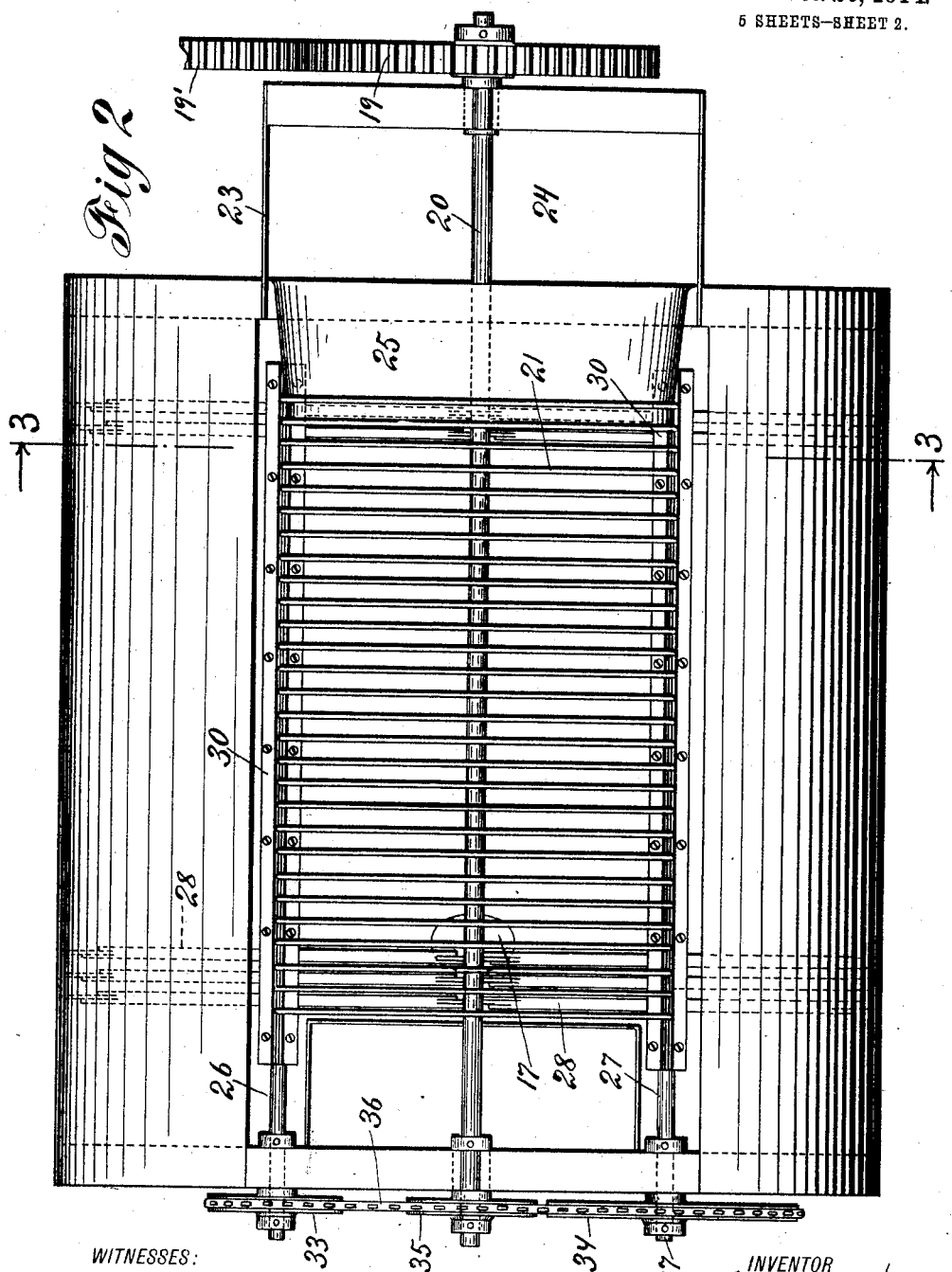

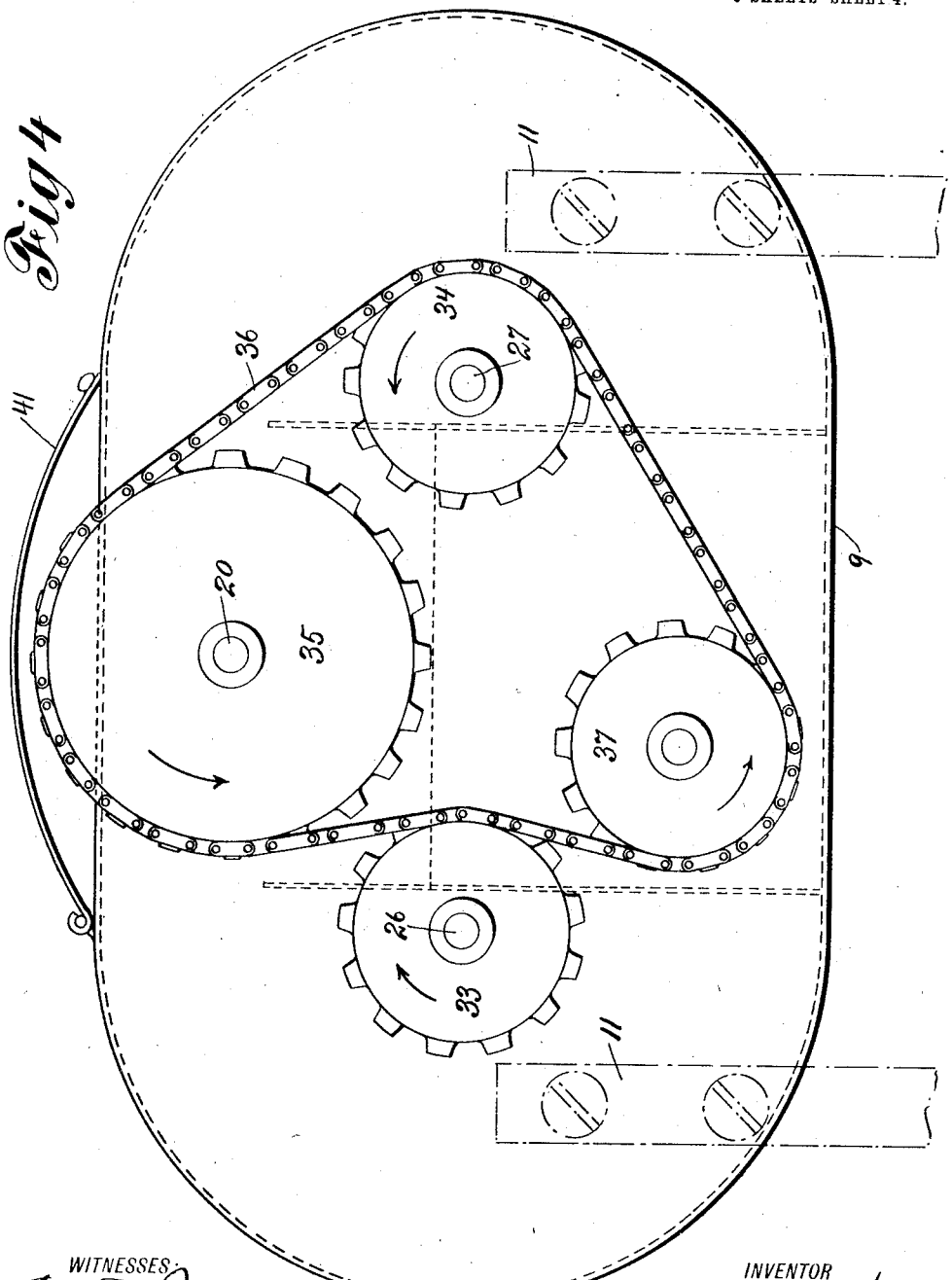

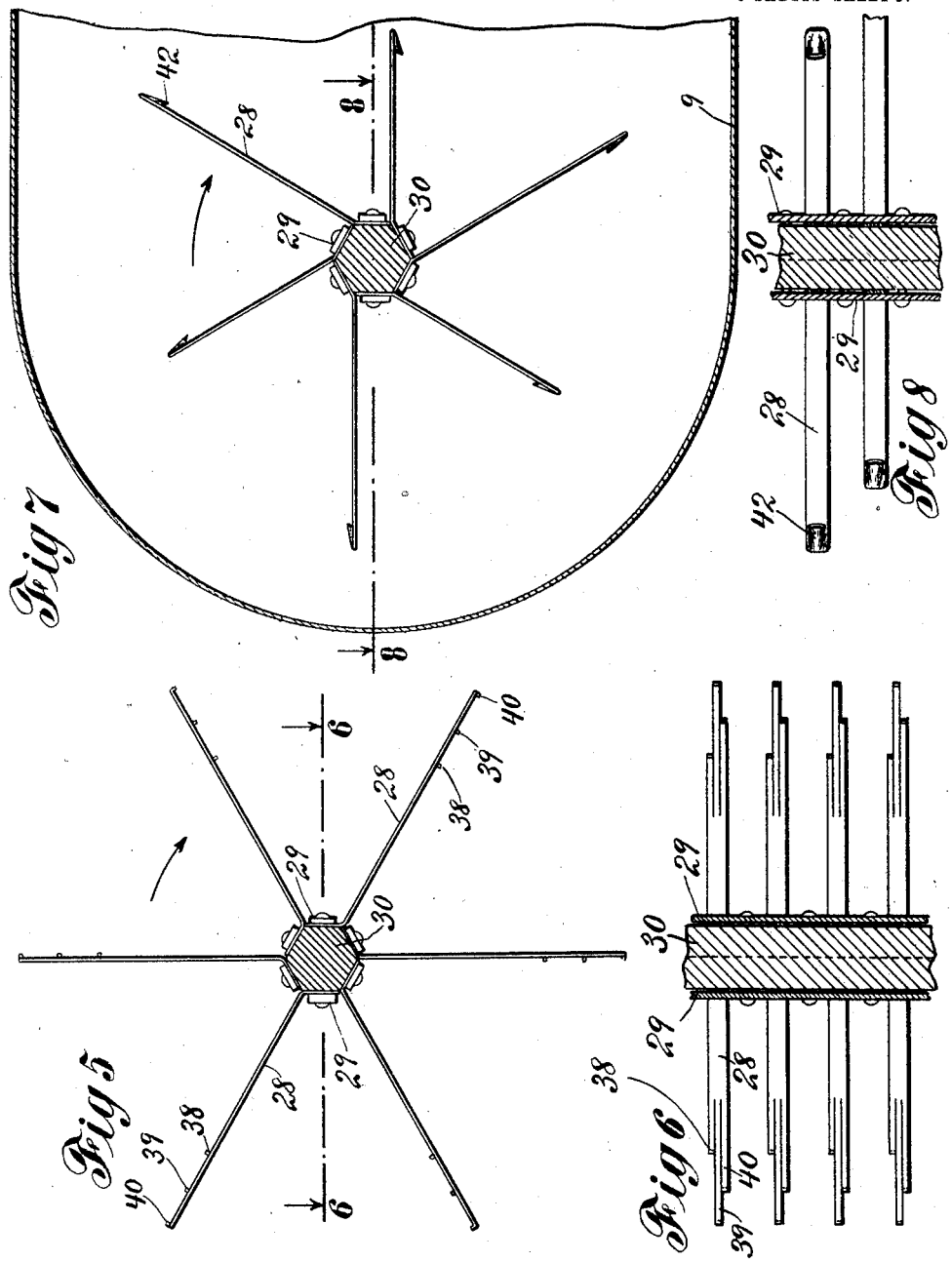

UNITED STATES PATENT OFFICE.

HENRY TRUST, OF NEW YORK, N. Y.

FOOD-HANDLING APPARATUS.

1,114,070.  Specification of Letters Patent.  Patented Oct. 20, 1914.

Application filed June 10, 1913. Serial No. 772,798.

*To all whom it may concern:*

Be it known that I, HENRY TRUST, a citizen of the United States, residing at Manhattan, in the county of New York and State of New York, have invented certain new and useful Improvements in Food-Handling Apparatus, of which the following is a specification, reference being had therein to the accompanying drawing.

My invention relates to improvements in apparatus adapted for peeling, scraping, cutting or removing the skins or outer coverings from vegetables, fruit and similar articles.

I have illustrated in the accompanying drawings a suitable type of machine showing a preferred application of my invention.

Figure 1 is a vertical longitudinal cross section of such a machine, Fig. 2 a plan view looking down upon Fig. 1, Fig. 3 a cross section partly broken away, on the line 3—3 of Fig. 2, with cover attached, Fig. 4 an end view looking rightwardly at Fig. 2 with cover in position, said Figs. 3 and 4 being on an enlarged scale, Fig. 5 a cross section of one of the peeling or scraping devices, Fig. 6 a section on the line 6—6 of Fig. 5, Fig. 7 an enlarged cross sectional view illustrating the position of one of the cutting or slicing mechanisms in position within part of the machine, and Fig. 8 a cross section on the line 8—8 of said mechanism shown in Fig. 7.

9 is the bottom of the machine which is adapted to be filled with water indicated by the reference character 10, said machine being supported upon the legs 11—12. The upper part 13 of the leg 12 it will be observed is hollowed to receive the lower portion 12 which is adjustably mounted therein and adapted to be secured in its adjusted position by any suitable means such as the wing nut 14; thus making it possible to give any desired inclination or tilt to the machine as a whole.

15 is a suitable plate or door through which projects the bolt 16 carrying the inner plate 17 and provided with a suitable nut such as 18. This it will be understood may be removed for draining and cleaning the machine when desired.

19 is the main driving wheel or gear of the machine mounted securely upon the shaft 20 which may be driven by the gear 19′ and which in turn carries suitable elliptical hoops or rings 21 which in turn are cross-braced by the rods 22 secured to the said shaft 20 as shown.

23 is a suitable hopper into which potatoes or other suitable vegetables or fruit may be introduced and which in turn are deposited upon the bottom 24 thereof and owing to the angle at which the machine is mounted, extend over the plate or wristlet 25 within reach of the scrapers or cutters 28 hereinafter described.

26—27 are shafts having six-sided bearings 30 thereon carrying the blades 28. By reference now to Figs. 6 and 8 it will be observed that these blades are secured beneath the binding strips 29 which in turn are secured to the six-sided bearings 30 by any suitable means such as the rivets shown. The shafts 26—27 it will also be observed are mounted in the ends 31—32 of the machine and are provided with sprocket wheels 33—34. By reference now to Fig. 4 it will be observed that the sprocket 35 upon the driving shaft 20 is provided with the sprocket chain 36 which in turn engages the sprocket wheels 33—34 and passes over the idler sprocket 37; thus insuring simultaneous and opposite rotation of the shafts 26—27.

By reference now to Figs. 5 to 8 inclusive it will be observed that the peeling or scraping fingers 38 to 40 shown more particularly in Figs. 5 and 6, are preferably constructed in different lengths as shown, and are preferably cut in sets of three out of resilient blades or arms 28 which may be secured as aforesaid. This type of tool it has been found is more particularly adapted for such vegetables as boiled potatoes where the skin is more easily removed. When it is desired to peel the skin from the potato however, before the same has been boiled, it has been found preferable to construct these fingers as shown to better advantage in Figs. 7 and 8, in which case it will be observed that a chisel-like point 42 is stamped out of the end of each of the blades 28 as shown. This enables the edge of the stamped out portion to cut into the surface of the vegetable and slice or cut the skin therefrom, whereas in the form of fingers shown in Figs. 5 and 6 the ends of the fingers are preferably turned sharply at about right angles as shown; thus allowing the sharp edges of the same to scratch, scrape or peel the skin from the vegetable or fruit.

In operation the articles to be peeled pass through the hoops or elliptical rings 21 from the feeding end of the machine leftwardly, and while passing therethrough it will be observed that the blades 28 are rotated simultaneously and oppositely, passing between said hoops and resiliently engaging the surfaces of the vegetables or fruits; thus effectively removing the outer covering therefrom which in turn is deposited into the water 10 within the container 9; thus at the same time washing the fingers and scrapers or cutters clean during the operation.

41 is a suitable cap or top which may be hinged as shown at 43 and which may be provided with a knob or other suitable means such as 44, the same being adapted to cover and protect the upper part of the machine as shown.

Of course it will be understood that various modifications may be made without departing from the spirit of the invention as claimed.

I claim:

1. In a machine of the class described, means for feeding food therethrough, said means comprising hoops rotating within a declined outer container, and arms adapted to pass between said hoops and engage the food passing therethrough, said arms having fingers of different lengths.

2. In a machine of the class described, means for feeding food therethough, said means comprising hoops rotating within a declined outer container, and arms adapted to pass between said hoops and engage the food passing therethrough, said arms having cutting fingers of different lengths in combination therewith.

3. In a machine of the class described, means for feeding food therethrough, said means comprising hoops rotating within a declined outer container, and arms adapted to pass between said hoops and engage the food passing therethrough, said arms tangentially mounted.

4. In a machine of the class described, means for feeding food therethrough, said means comprising elliptical hoops rotating within an outer container, and arms adapted to pass between said hoops and engage the food passing therethrough.

5. In a machine of the class described, means for feeding food therethrough, said means comprising hoops rotating within a declined outer container, and arms adapted to pass between said hoops and engage the food passing therethrough, a container for water below said arms into which the peelings from said food may drop and through which said arms may pass.

6. In a machine of the class described, means for feeding food therethrough, said means comprising hoops rotating within a declined outer container, and arms adapted to pass between said hoops and engage the food passing therethrough, said arms being adapted to move in opposite directions.

7. In a machine of the class described, means for feeding food therethrough, said means comprising hoops rotating within an outer container, and cutters adapted to pass between said hoops and engage the food passing therethrough, said cutters of different lengths.

In testimony whereof I hereunto affix my signature in the presence of two witnesses.

HENRY TRUST.

Witnesses:
LOUISE ENDERLE,
THOMAS A. HILL.

---

Copies of this patent may be obtained for five cents each, by addressing the "Commissioner of Patents, Washington, D. C."